(12) United States Patent
Ward

(10) Patent No.: US 6,371,628 B1
(45) Date of Patent: Apr. 16, 2002

(54) POST-INSTALLATION ADJUSTABLE LIGHTING FIXTURE

(75) Inventor: Patrick H. Ward, San Antonio, TX (US)

(73) Assignee: Lucifer Lighting Company, San Antonio, TX (US)

(*) Notice: Subject to any disclaimer, the term of this patent is extended or adjusted under 35 U.S.C. 154(b) by 0 days.

(21) Appl. No.: 09/498,235

(22) Filed: Feb. 3, 2000

(51) Int. Cl.[7] .............................................. F21V 21/14
(52) U.S. Cl. .................... 362/287; 362/421; 362/427; 362/581; 248/288.51; 403/122
(58) Field of Search .................. 362/421, 287, 362/427, 581, 551; 248/288.51; 403/122, 76

(56) References Cited

U.S. PATENT DOCUMENTS

| | | | |
|---|---|---|---|
| 2,782,295 A | 2/1957 | Schwenkler | 240/7.35 |
| 3,803,400 A | 4/1974 | Ozawa | 240/61 |
| 4,751,627 A | 6/1988 | Usher | 362/421 |
| 4,753,510 A * | 6/1988 | Sezerman | |
| 5,183,330 A | 2/1993 | Rishel et al. | 362/372 |
| 5,404,297 A | 4/1995 | Birk et al. | 362/421 |
| 5,704,578 A * | 1/1998 | Fischer | 248/288.51 |
| 5,997,208 A * | 12/1999 | Urbach et al. | 403/137 |

* cited by examiner

Primary Examiner—Thomas M. Sember
(74) Attorney, Agent, or Firm—Jenkens & Gilchrist, A Professional Corporation

(57) ABSTRACT

A post-installation adjustable lighting fixture comprises an eyeball captured between a flange and retention means which are rotatably coupled so that the eyeball is swivelably received by the flange and retention means. The eyeball is constructed so that it can be removably attached to an open-ended adjusting tool which provides easy adjustment of the eyeball position after the fixture is installed on a mounting surface. The tool may be left in place to act as a glare reduction device, baffle, or projection device. The tool may alternatively be separated from the eyeball to provide a conventional appearance for the fixture. Lubricious material may be interposed between the eyeball and the receiving surfaces of the flange and retention means to further ease positional adjustment of the eyeball within the

23 Claims, 5 Drawing Sheets

POST-INSTALLATION ADJUSTABLE LIGHTING FIXTURE

BACKGROUND OF THE INVENTION

1. Technical Field

This invention relates generally to the field of lighting fixtures, and more particularly, to an apparatus and method which are particularly useful in the installation of adjustable lighting fixtures.

2. History of Related Art

Lighting fixtures such as spotlights, including wall or ground-mounted lights and ceiling-mounted downlights, are well known in the art for task lighting and artistic illumination of interior and exterior settings. Such lighting fixtures are frequently adjustable and may be categorized according to two different types: a conventional lamp based fixture illuminated by means of electric power connected to the lamp socket within the fixture, or a remote lamp based fixture relying on a fiber optic illuminator to pipe light through an optical light guide to the body of the fixture. In each case, it is generally desirable to easily and precisely adjust the beam pattern provided by the fixture, and then rigidly fix the orientation of the fixture so that the resulting illumination pattern remains constant. Implementing such adjustments are most desirable after the fixture has been mounted in place.

Prior art lighting fixtures generally provide some type of gimballed sphere which can be locked in place by tightening set screws located on the side of the fixture. However, these set screws are often located above the ceiling height where the downlight resides, and therefore cannot be easily adjusted after the fixture is mounted to the ceiling.

Another problem which exists with currently available fixtures is the tension that exists between providing a fixture that accommodates adjustable illumination positioning, while enabling a rigid fixation of the illumination after adjustment. Providing easy adjustment often disables the ability to firmly lock the fixture into its final position. Conversely, the ability to firmly situate the fixture after final adjustments often defeats the ability to easily adjust the fixture, either initially or at some future time. This difficulty is exacerbated in the case of fiber optic fixtures, since the forces within the fiber as it curves away from the fixture tends to move the fixture out of adjustment over time. This is especially true for large diameter glass-core fiber, and large diameter, solid-core plastic fibers, which can be particularly rigid. Some of the currently-available fixtures attempt to solve this problem by the inclusion of a strain relief above the fixture. However, this tends to increase the total fixture height, is more expensive, and precludes the use of such fixtures in low-clearance applications.

Therefore, what is needed is a lighting fixture which allows adjustable placement of illumination after installation. Such a fixture should be easy to adjust, while providing for firm fixation of the illuminating elements after adjustment. Further, such a fixture should be useful for both conventional and fiber optic lighting, while accommodating low-clearance installation heights (e.g., as little as 2 inches above the ceiling). Finally, such a fixture should obviate the need for a separate strain relief when used with optical light guides, and require a minimal number of parts for ease of manufacture and inexpensive production. Any tools required for installation should be readily available, or so inexpensive as to be sold along with the fixture itself.

SUMMARY OF THE INVENTION

The present invention is embodied by a post-installation adjustable lighting fixture which includes a typically-spherical eyeball captured between a flange and a retention means. The flange and retention means both have circular openings for swivelable reception and retention of the eyeball, respectively. The eyeball is captured between the flange and retention means by a rotatable coupling means, and an adjusting tool is used after attachment to the eyeball, to position the eyeball with respect to the retention means for the desired illumination effect. The fixture is designed so that attachment of the adjustment tool and positioning of the fixture illumination can occur after the fixture is installed at a fixed location, such as in a ceiling.

The eyeball may include a lens for focusing the light from a conventional lamp, or light provided by the introduction of a fiber optic light guide into the interior of the eyeball. The eyeball may be cushioned against the presence of the retention means and flange by use of upper and/or lower rings made out of a lubricious material, such as an acetyl resin.

The adjustment tool is open-ended, and may be left in place (i.e., attached to the eyeball) after it is used to adjust the fixture illumination. The tool may include internal grooves to control glare from the fixture and/or a filter to modify the illumination pattern provided by the fixture.

The present invention also includes a method of installing a lighting fixture for optical fiber which includes the steps of inserting the fiber into the eyeball, adjusting and fixing the insertion point of the fiber to produce a predetermined illumination pattern, attaching the retention means to the flange so as to capture the eyeball, attaching the adjustment tool to the eyeball and adjusting the position of the eyeball with respect to the retention means, and fixing the position of the eyeball with respect to the retention means by tightly engaging the retention means to the flange. The method may also include the steps of inserting the optical fiber through an opening in the flange and mounting the flange to a ceiling. Also, the upper and lower rings mentioned previously may be inserted between the eyeball, the flange, and the retention means. Finally, a filter may be placed into the adjustment tool before attachment to the eyeball and the adjustment tool may be separated from the eyeball after installation and adjustment is complete.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 1:
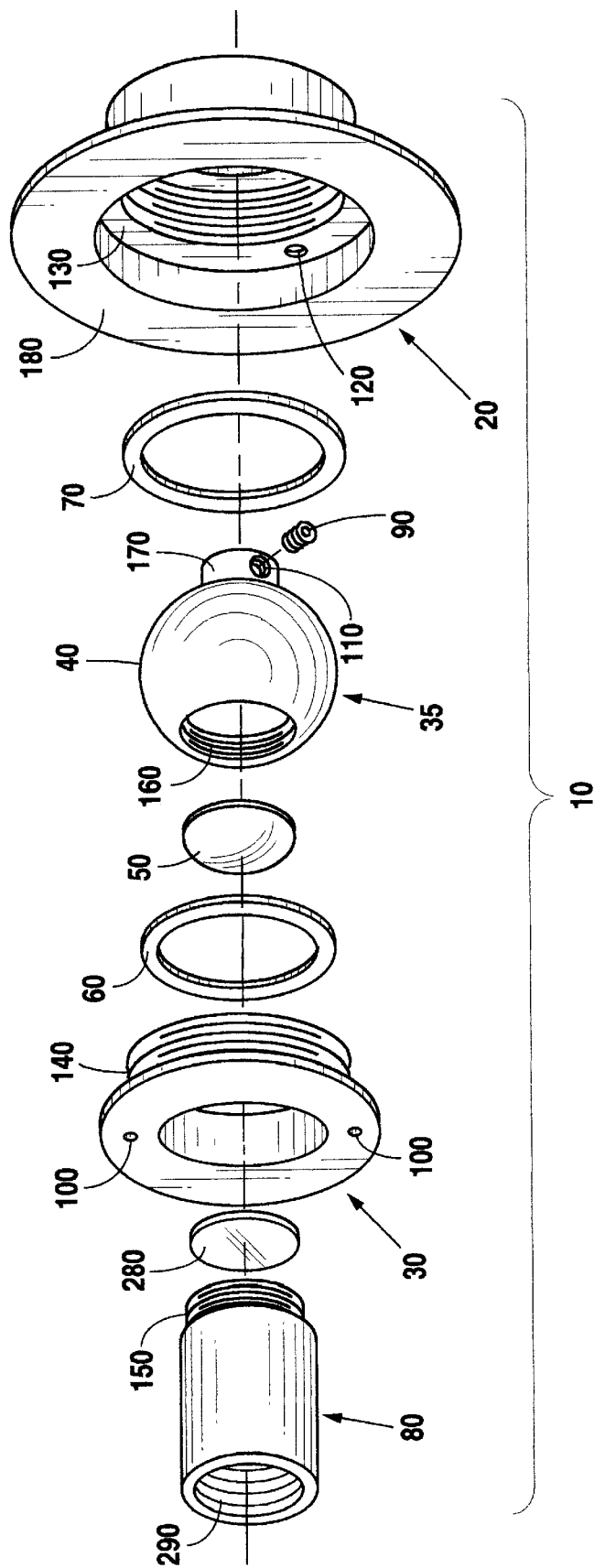
FIG. 1 is a perspective, exploded view of a preferred embodiment of the present invention.
Figure 2:
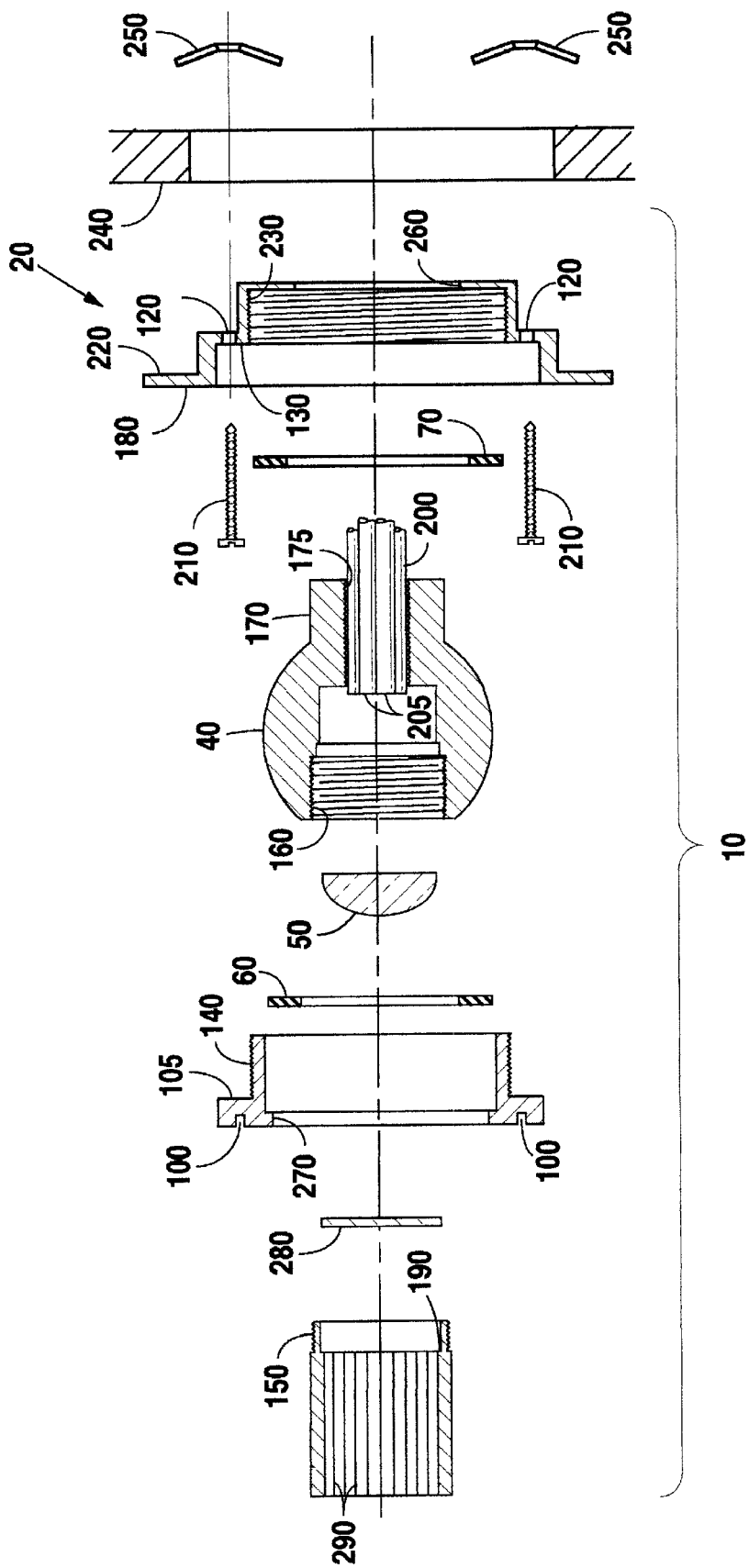
FIG. 2 is a side, cut-away, disassembled view of a preferred embodiment of the present invention.

Turning now to FIGS. 1 and 2, an exploded perspective view and a cut-away disassembled side view, respectively, of the preferred embodiment of the post-installation adjustable lighting fixture 10 of the present invention can be seen. The fixture 10, which is typically used with fiber optic light guide 200, is made up of four major components: a flange 20, a spherical eyeball 35, an eyeball retention means 30, and an adjusting tool 80.

The flange 20 has a first circular opening 260 for swivelably (i.e. single or multiple axis continuously—variable positioning) receiving the eyeball 35. If the flange 20 is part of a downlight, then the flange 20 will normally be provided with one or more mounting ports 120 through which a fastening device, such as a screw 210 can be inserted for fixed attachment to a mounting plane, such as a ceiling or wall 240. The most common means of securing the flange 20 to the mounting plane 240 makes use of a retention clip 250 which engages the threads of the screw 210 and provides a compressive force against the mounting plane 240 as the screw 210 is engaged therewith. Such installation may occur at ground level, in a wall, or in any other surface where it is desirable to orient the position of the eyeball 35 within the fixture 10 from the exterior of the fixture 10, or when minimal clearance is available to accommodate the height of the fixture 10. The rear face 220 of the flange 20 will thereby rest flush against the mounting plane 240 (as illustrated), while the outer face 180 of the flange 20 will be exposed to view.

The eyeball 35 is semi-spherical in shape, as characterized by the housing 40. The spherical surface of the body 40 allows swivelling adjustment of the eyeball 35 position as received by the first circular opening 260 of the flange 20. While not absolutely necessary to the function of the fixture 10, it is preferable to introduce an upper ring 70, interposed between the flange 20 and the eyeball 35. The upper ring 70 is typically made of a lubricious material, such as a polyamide, a flouroplastic, an acetyl resin, a polymerized chloroprene, or a flourocarbon resin. The products commonly available which embody these chemical compositions include NYLON™, TEFLON™, DELRIN™, NEOPRENE™, and modified versions of TEFLON™, respectively. Preferred materials for the upper ring 70 allow the eyeball 35 to move freely against the first circular opening 260 provided by the flange 20 during the adjustment of the eyeball 35 position with respect to the flange 20, while providing enough friction when under compression to retain the eyeball 35 firmly in place with respect to the location of the flange 20. The eyeball 35 may also comprise a neck 170 which is used to stabilize electrical cable or fiber optic cable 200 which may be inserted into the body 40 of the eyeball 35. The neck 170 may contain neck threads 175 which engage a threaded ferrule (not shown), or the outer jacket of the light guide 200 so that the eyeball 35 can be effectively "screwed on" to the light guide 200 jacket for precise positioning and insertion of the light guide 200 into the eyeball 35. The neck 170 also serves as a focusing tube 170, relative to the lens 50. As seen in FIG. 1, a setscrew 90 may be introduced into the neck 170 by means of a locking port 110 so as to prevent the light guide 200 from moving in or out of the neck 170 after final positioning adjustments have been made. The neck 170 constitutes a means for slidably or rotatably (if threaded) receiving the optical light guide 200. Of course, this function could also be accomplished by a simple aperture formed into the body 40 of the eyeball 35. Preferably, a lens 50, usually of the plano-convex type, will be retained in the body 40 of the eyeball 35. The lens 50 assists in focusing the illumination provided by the fiber optic light guide 200, or a conventional lamp (not shown) which resides within the body 40 of the eyeball 35.

The eyeball retention means 30 of the fixture 10 is used to capture the eyeball 35 while allowing swivelable adjustment. The retention means 30 has a second circular opening 270 which provides for swivelably retaining the eyeball 35, as it rests against the second circular opening 270, in a similar fashion to that described for the physical interface between the eyeball 35 and the flange 20. Once again, while not absolutely necessary, a lower ring 60 maybe inserted between the body 40 of the eyeball 35 and the second circular opening 270. The lower ring 60 is most preferably made of the same materials as the upper ring 70, described above.

Figure 3A:
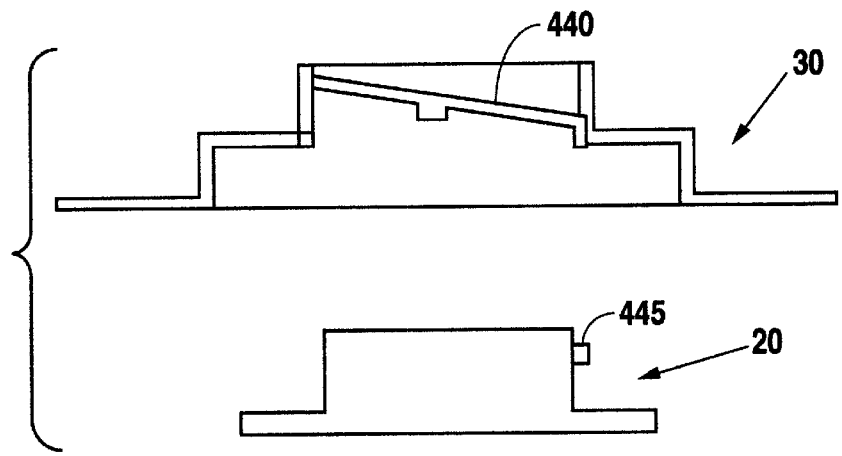
FIGS. 3A and 3B are side views of the flange and eyeball retention means.
Figure 3B:
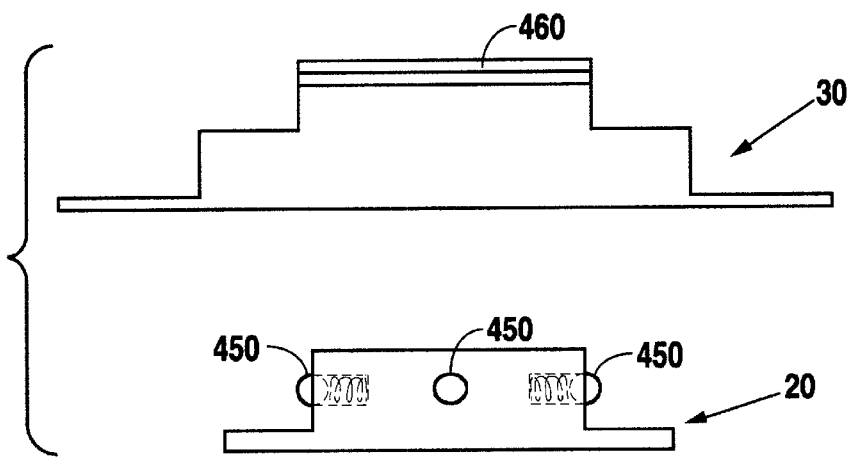

The retention means 30 has a means for rotatably coupling to the flange 20 so as to capture the eyeball 35 between the flange 20 and the retention means 30. As illustrated in FIGS. I and 2, the means for rotatably coupling to the flange 20 may comprise retainer threads 140, which engage flange threads 230. However, the means for rotatably coupling to the flange 20 may also comprise a locking ramp 440 with mating cam surfaces 445 as is shown in FIG. 3A. The retention means 30 may also be attached to the flange 20 using a series of simple screws (not shown) to compress and capture the eyeball body 40 between the retention means 30 and the flange 20, or ball plungers 450 which are received by one or more race ways 460, as shown in FIG. 3B.

When the retainer threads 140 begin to engage the flange threads 230, the eyeball 35 is lightly captured between the retention means 30 and the flange 20. The eyeball 35 is then free to swivel in this lightly-captured position. However, as the retention means 30 is rotated so as to further engage the retainer threads 140 with the flange threads 230, a compressive force is exerted against the eyeball 35 as it rests against the first circular opening 260 and second circular opening 270 (or the lower and upper rings 60 and 70, as appropriate). One method of moving the retention means 30 with respect to the flange 20 so as to more tightly capture the eyeball 35 between the retention means 30 and the flange 20 involves the use of a spanner wrench (not shown), which engages the spanner holes 100. Such a wrench can be inexpensively stamped from steel material and included as a component which is sold along with the lighting fixture 10. Once the retention means 30 is fully-engaged with the flange 20, securing the eyeball 35 in a fixed position with respect to the retention means 30 and the flange 20, it can be seen that the covering face 105 will obscure the mounting ports 120, the inner face 130, and the screws 210 (if used). This method of assembly provides an aesthetically pleasing appearance the fixture 10.

The adjusting tool 80 has a means for removable attachment to the eyeball 35. As illustrated in FIGS. 1 and 2, the means for removable attachment comprise tool threads 150, which engage the housing threads 160 of the eyeball 35. The adjusting tool 80 is open-ended to allow light, which emanates from the body 40 of the eyeball 35, to pass through the body of the adjusting tool 80 and on toward the desired location which is to be ultimately illuminated. The tool 80 may be left attached to the eyeball 35, or separated from the eyeball 35 after placement is complete, according to the desire of the user. The tool 80 is typically allowed to remain attached to the eyeball 35 for several reasons: to control glare, to conceal the source of light, either fully or partially, or perhaps, to permit later orientation and adjustment of the eyeball 35. If left in place, the tool 80 may accommodate a filter 280, which is received at a shelf 190 therein. Of course, instead of a filter 280, a baffle 280 or condenser lens 280 may also be placed on the shelf 190. Use of a condenser lens 280 and a filmstrip can be used to project the filmstrip image from the fixture 10 to a remote location. The interior of the tool 80 may have internal grooves 290 formed thereon to act as a baffle for the illumination which emanates from the fixture 10. These grooves may be formed in any of several patterns, including horizontal grooves as illustrated in FIG. 1, or vertical grooves, as illustrated in FIG. 2.

Figure 3C:
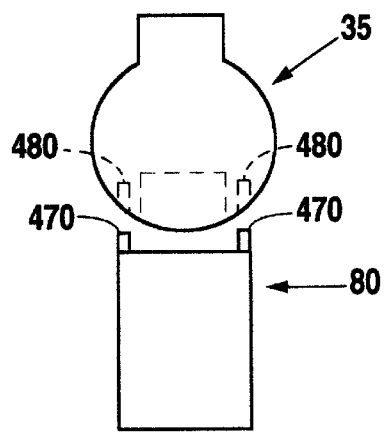
FIG. 3C is a side view of the eyeball and the adjusting tool.

The means for removable attachment to the eyeball may comprise threads 150, as described above, or other means. These include pins 470 wherein the eyeball 35 includes one or more sockets 480 for receiving the pins, as shown in FIG. 3C.

Figure 4A:
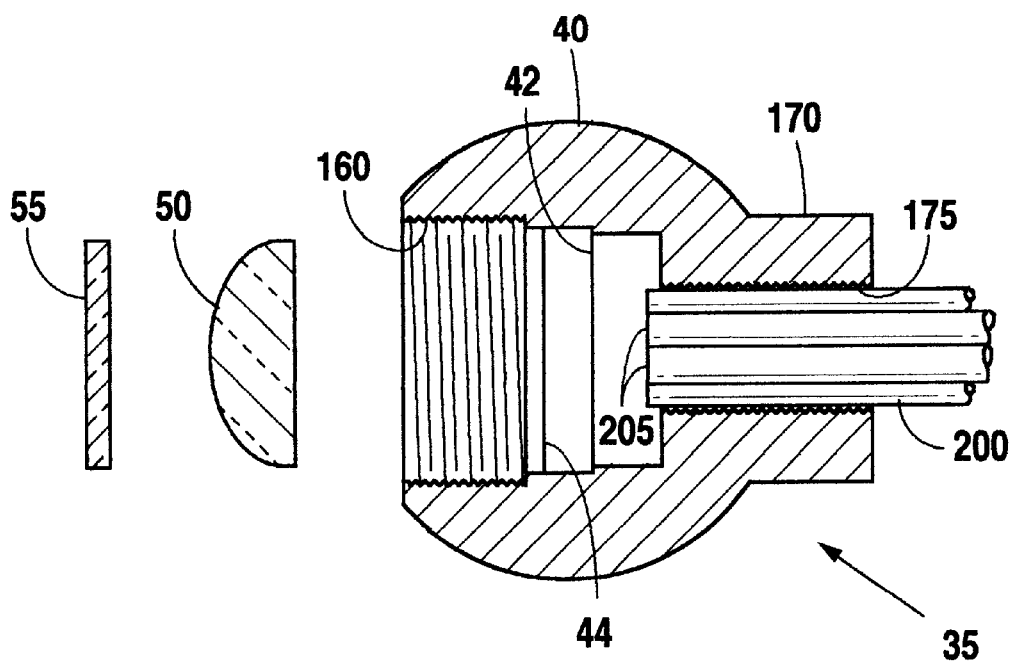
FIGS. 4A and 4B are side, cut-away, exploded views of alternative embodiments of the present invention.
Figure 4B:
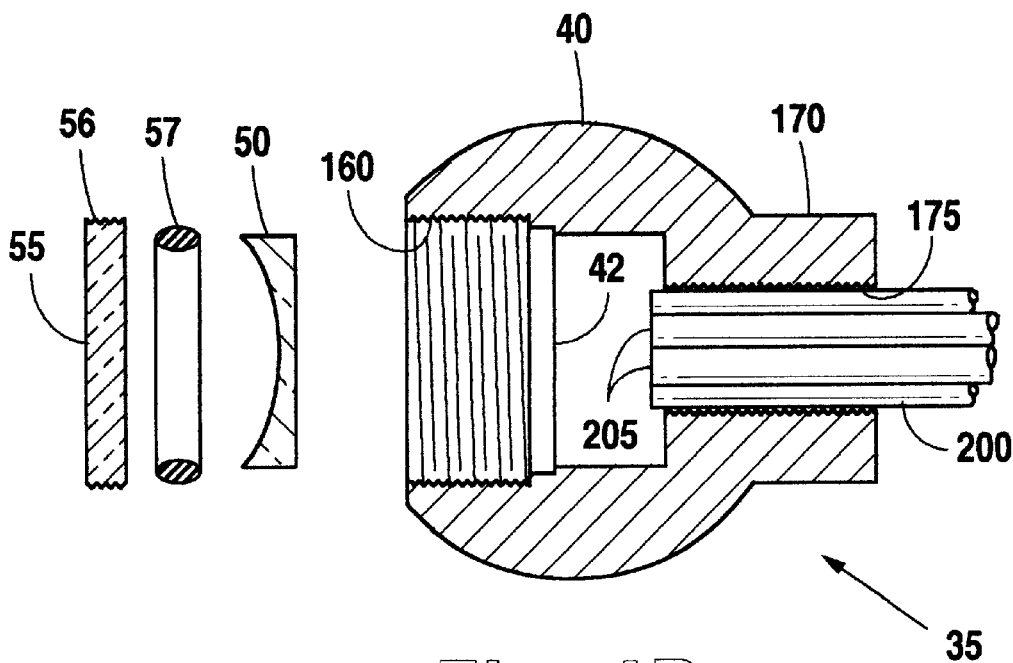

Alternative embodiments of the present invention can be seen in FIGS. 4A and 4B, in which is illustrated a version of the eyeball 35 designed specifically for high humidity and outdoor environments. In FIG. 4A, the lens 50 is allowed to rest on the lens shelf 42. A groove 44 may be filled with a flexible sealant, such as silicone adhesive, and a plastic protective cover 55 may be seated thereon. Thus, the adhesive sealant placed in the groove 44 serves to hold the lens 50 in place on the shelf 42, and to retain the cover 55 within the body 40 of the eyeball 35. The lens 50 and cover 55 are typically not assembled so as to be in direct, abutting contact.

FIG. 4B illustrates how a lens 50 (which may be aspheric, plano-convex, or plano-concave, as shown here) is permitted to rest against shelf 42 within body 40 of the eyeball 35. Different types of lenses 50 may be used to adjust the spot size provided by the eyeball 35. A piano-convex lens is better for focusing the light, while a piano-concave or aspheric lens is best for providing a flood effect. An O-ring 57 is placed against the lens 50, and retained thereon by the cover 55, which is threaded into the body 40 by engaging the housing threads 160 and the cover threads 56. In the case of FIGS. 4A and 4B, a moisture-resistant seal is obtained for the light guide 200 termination 205.

Figure 5:
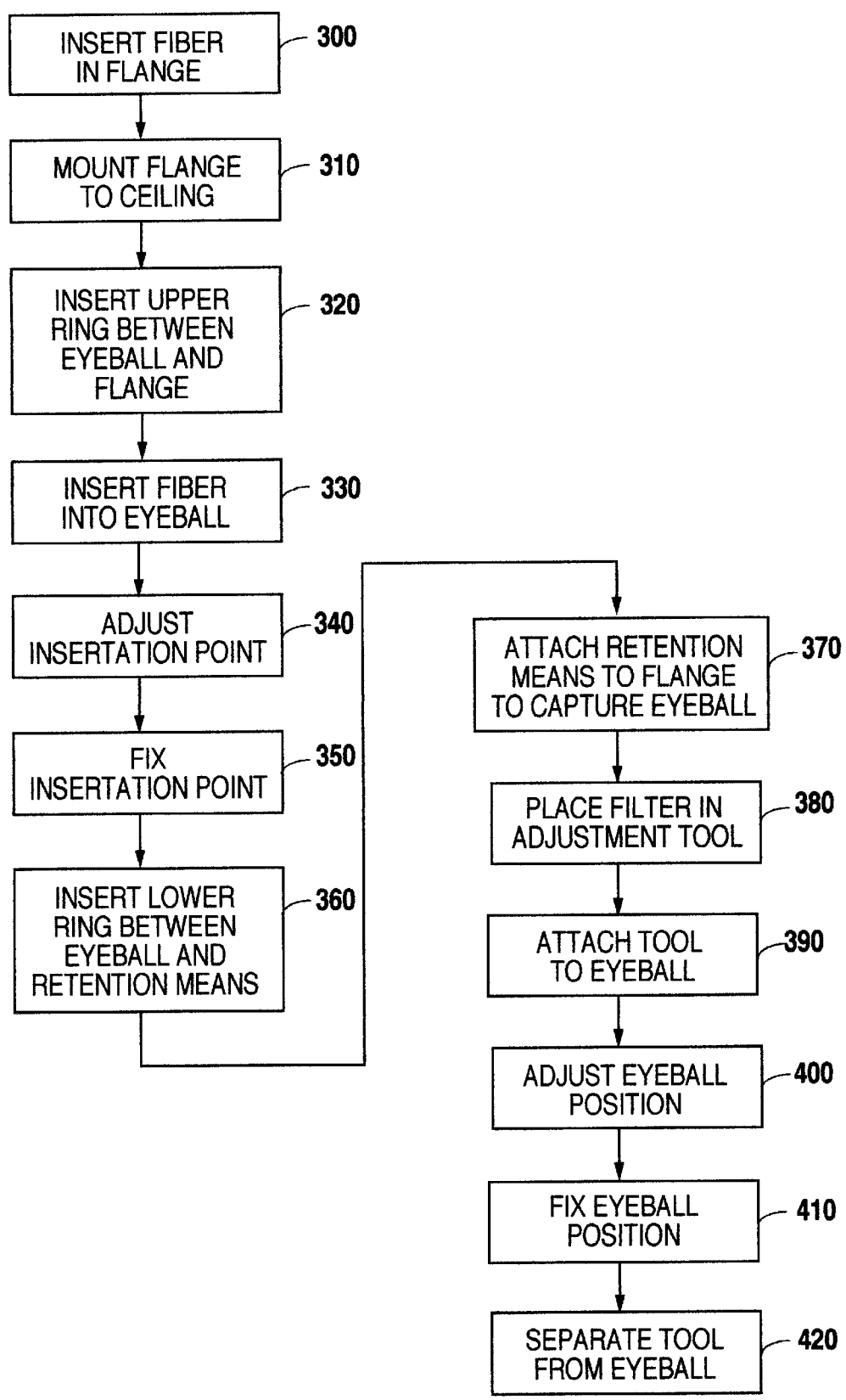
FIG. 5 is a flowchart of the method used to install the preferred embodiment of the present invention.

Turning now to FIG. 5, which is a flow chart of a method for installing the instant invention, and referring back to FIGS. 1 and 2, it can be readily understood that some steps of the installation procedure are optional, depending upon use of particular components in the inventive embodiment, especially the lower and upper rings 60 and 70. Further, if the fixture 10 is not installed into a ceiling, but in some other location, other steps will also be optional.

For installation into a ceiling, a hole in the ceiling 240 will typically be made prior to installation of a fixture 10 so as to accommodate the flange 20. Contract installations will typically provide optical fiber light guides 200 with a termination 205 at the opening into the ceiling 240. In this case, the method begins with inserting the optical fiber 200 through an opening (e.g., the first circular opening 260) in the flange 20, at step 300. The method continues with mounting the flange 20 to the ceiling 240 in step 310. Of course, if ceiling mounting is not desired, then steps 300 and 310 are optional. The method also includes the step of inserting the upper ring 70 between the eyeball 35 and the flange 20 in step 320 where use of an upper ring 70 is desired. Otherwise, step 320 is also optional.

The method also includes the step of inserting the optical light guide 200 into the eyeball 35 at step 330. If there are no neck threads 175 formed into the neck 170, then the cable may be moved in and out of the body 40 of the eyeball 35 without rotational motion, using a compression fitting. However, it is preferred that neck grooves 175 be formed into the neck 170 so that the setscrew 90 is further assisted in maintaining the precise positioning of the light guide 200 within the body 40 of the eyeball 35. As the insertion point of the fiber optic light guide 200 is adjusted within the body 40, a predetermined illumination pattern will be formed through the cooperating activity of the light which exits the termination 205 of the optical light guide 200, and the lens 50. The insertion point into the focusing tube, or neck 170 is adjusted by adjusting the position of the optical light guide 200 within the focusing tube 170 at step 340, and fixed within the eyeball 35 at step 350. At this point, an optional step 360, may be accomplished. Here, the lower ring 60 may be inserted between the eyeball 35 and the retention means 30 as described above. After the cable insertion point is fixed and the lower ring is inserted, the retention means 30 is engaged with the flange 20 so as to loosely capture the eyeball 35 between the retention means 30 and the flange 20 in step 370.

At this point, it is possible to place a filter 280 or lens 280 within the body of the adjusting tool 80 on the shelf 190. This occurs at step 380.

The tool 80 may now be attached to the eyeball 35 in step 390, and the position of the eyeball 35 with respect to the retention means 30 may be adjusted by manual manipulation of the tool 80 in step 400. Loosely capturing the eyeball 35 between the flange 20 and the retention means 30 contributes to easy adjustment of the eyeball position using the tool 80. Also, light emanating from the fixture 10 is able to pass through the open-ended tool 80 to illuminate the desired object. Thus, the illumination provided by the fixture 10 may be easily adjusted after installation of the fixture 10 in a ceiling 240, or other mounting point. Once the desired position of the eyeball 35 has been achieved, the eyeball 35 may be fixed in position with respect to the retention means 30 by rotating the retention means 30 with respect to the flange 20 so as to more tightly capture the eyeball 35 between the retention means 30 and the flange 20. This is accomplished in step 410. Typically, this is made to occur by engaging a spanner wrench in the spanner holes 100 and causing the rotatable coupling means, or retainer threads 140 to further engage the flange threads 230. If a locking ramp 440 is used as a means of rotatable coupling between the flange and the retention means, a similar rotational movement will also result in locking the eyeball 35 in place.

As a final, optional step, the tool 80 may be separated from the eyeball 35 to provide a conventional appearance for the fixture 10. However, the tool 80 may also be left attached to the eyeball 35 as a means of controlling the fixture 10 illumination pattern, reducing glare, and/or used to mount a filter 280 over the lens 50 aperture.

The fixture 10 disclosed herein obviates the need for a strain relief when a glass or plastic core light guide is used within the body 40 of the eyeball 35. Thus, the fixture 10 is readily installed in a typical ceiling as a downlight, even where minimal clearance is available. Further, the fixture 10 is readily adjusted, both for the insertion point of the light guide 200 termination 205 into the eyeball 35, and with respect to orienting the ultimate destination and distribution of the illumination pattern obtained by the fixture 10. Any subsequent changes in the orientation of the illumination pattern can be easily accomplished by the user and require no special installation personnel, or disassembly of the fixture 10. A spanner wrench may simply be inserted into the spanner holes 100 and the position of the eyeball 35 within the fixture 10 can be reset using the adjusting tool 80.

The present invention can be adapted to accept a conventional incandescent or halogen lamp, such as a halogen dichroic reflector lamp, which is powered conventionally by an AC line or a low voltage power supply. Orientation adjustment and fixture position stability are accomplished using the same mechanical interface described above.

Although the present invention is described in terms of a preferred exemplary embodiment, other uses of the invention, such as ground or wall installations, indoors and outdoors, are contemplated. Such uses are intended to fall within the scope of the following claims. Other aspects, features, and advantages of the present invention may be obtained from a study of this disclosure and the drawings, along with the appended claims.

What I is claim is:

1. A post-installation adjustable lighting fixture, comprising:
    a hollow spherical eyeball for adjusting the location of the illumination pattern of the lighting fixture;
    a flange having a first circular opening for swivelably receiving said hollow spherical eyeball;
    an eyeball retention means having a second circular opening for swivelably retaining said hollow spherical eyeball, and a means for rotatably coupling to said flange so as to capture said hollow spherical eyeball between said flange and said eyeball retention means; and
    an open-ended adjusting tool having a means for removable attachment to said hollow spherical eyeball.

2. The fixture as defined in claim 1, wherein a lens is disposed within said hollow spherical eyeball.

3. The fixture of claim 1, wherein the means for rotatably coupling to the flange comprise threads.

4. The fixture of claim 1, wherein the means for rotatably coupling to the flange comprises a locking ramp.

5. The fixture of claim 1, wherein the means for removable attachment comprise threads.

6. The fixture of claim 1, wherein the means for removable attachment comprise pins and the eyeball includes sockets for receiving the pins.

7. The fixture of claim 1, wherein the retention means includes a multiplicity of spanner holes.

8. The fixture of claim 1, wherein an upper ring comprising lubricious material is interposed between the flange and the eyeball.

9. The fixture of claim 8, wherein the material is selected from the group consisting of: a polyamide, a flouroplastic, an acetyl resin, a polymerized chloroprene, or a flourocarbon resin.

10. The fixture of claim 1, wherein a lower ring comprising lubricious material is interposed between the retention means and the eyeball.

11. The fixture of claim 1, wherein the tool has internal grooves.

12. The fixture of claim 1, wherein the tool has an internal shelf for receiving a filter.

13. A post-installation adjustable lighting fixture for connection to an optical light guide, comprising:
    a hollow spherical eyeball for adjusting the location illumination pattern of the lighting fixture, said hollow spherical eyeball having a means for receiving the optical light guide;
    a flange having a first circular opening for swivelably receiving said hollow spherical eyeball;
    an eyeball retention means having a second circular opening for slidably retaining said hollow spherical eyeball, and a means for rotatably coupling to said flange so as to capture said hollow spherical eyeball between said flange and said eyeball retention means; and
    an adjusting tool having a means for removable attachment to said hollow spherical eyeball.

14. The fixture for connection to an optical light guide as defined in claim 13, wherein said means for receiving the optical light guide includes a means for removable retention of the optical light guide.

15. The fixture for an optical light guide of claim 13, wherein the means for receiving the optical light guide includes a focusing tube.

16. The fixture for an optical light guide of claim 15, wherein the focusing tube also serves as a means for removable retention of the optical light guide.

17. A method of installing a lighting fixture for connection to an optical light guide comprising the steps of:
    inserting the optical light guide into an eyeball;
    adjusting the insertion point of the optical light guide to produce a predetermined illumination pattern;
    fixing the insertion point of the optical light guide within said eyeball;
    attaching a retention means to a flange so as to capture said eyeball between said retention means and said flange;
    attaching an adjustment tool to said eyeball;
    adjusting the position of said eyeball with respect to said retention means; and
    fixing the position of said eyeball with respect to said retention means by moving said retention means with respect to said flange so as to more tightly capture said eyeball between said retention means and said flange.

18. The method of claim 17, further comprising the step of separating said adjustment tool from the eyeball.

19. The method of claim 17, further comprising the steps of:
    inserting the optical light guide through an opening in said flange; and
    mounting said flange to a ceiling.

20. The method of claim 17, further comprising the step of inserting an upper ring between said eyeball and said flange.

21. The method of claim 17, further comprising the step of inserting a lower ring between said eyeball and said retention means.

22. The method of claim 17, further comprising the step of placing a filter in said adjustment tool.

23. The method of claim 17, wherein the lighting fixture includes a focusing tube, and wherein the step of adjusting the insertion point of the optical light guide to produce a predetermined illumination pattern, further includes the step of adjusting the position of the optical light guide within said focusing tube.

* * * * *